(12) United States Patent
Shiozaki et al.

(10) Patent No.: US 6,920,099 B2
(45) Date of Patent: Jul. 19, 2005

(54) OPTICAL DISK RECORDING APPARATUS

(75) Inventors: Yoshihiko Shiozaki, Hamamatsu (JP); Tomoaki Hirai, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 616 days.

(21) Appl. No.: 09/965,357

(22) Filed: Sep. 27, 2001

(65) Prior Publication Data
US 2002/0039339 A1 Apr. 4, 2002

(30) Foreign Application Priority Data
Sep. 29, 2000 (JP) ....................... 2000-299009

(51) Int. Cl.$^7$ ................................ G11B 7/00
(52) U.S. Cl. ..................... 369/53.27; 369/47.51
(58) Field of Search ............... 369/47.5, 47.51, 369/47.52, 47.53, 53.26, 53.27, 53.37, 116

(56) References Cited

U.S. PATENT DOCUMENTS

| | | | | |
|---|---|---|---|---|
| 5,495,463 | A | 2/1996 | Akagi et al. ............ | 369/116 |
| 5,841,747 | A | 11/1998 | Kubota et al. | |
| 6,031,803 | A | 2/2000 | Kubota et al. | |
| 6,339,578 | B1 * | 1/2002 | Sasaki et al. .......... | 369/116 |
| 6,618,334 | B1 * | 9/2003 | Yamamoto ............ | 369/47.51 |
| 2002/0041552 | A1 | 4/2002 | Shiozaki et al. ...... | 369/53.26 |

FOREIGN PATENT DOCUMENTS

| | | |
|---|---|---|
| JP | 63-121130 | 5/1988 |
| JP | 02-005221 | 1/1990 |
| JP | 02-173972 | 7/1990 |
| JP | 05-028495 | 2/1993 |
| JP | 07-044868 | 2/1995 |
| JP | 08-339625 | 12/1996 |
| JP | 09-045982 | 2/1997 |
| JP | 11-296858 | 10/1999 |
| JP | 2000-082230 | 3/2000 |

* cited by examiner

Primary Examiner—Paul W. Huber
(74) Attorney, Agent, or Firm—Pillsbury Winthrop Shaw Pittman LLP

(57) ABSTRACT

An optical disk recording apparatus operates in a write mode for controlling a laser driver to alternate a laser power between a target write level and a target bottom level so as to write a signal at a constant density into an optical disk which is rotated at a constant angular velocity. A controller operates in the write mode for outputting a bottom level control signal according to a difference between an actual bottom level and the target bottom level. The controller operates in a pre-write mode prior to the write mode for performing a writing operation at different linear velocities along the optical disk to sample at least first and second bottom levels of the laser power, and operates in the write mode for monitoring a linear velocity at a point of the optical disk where the signal is to be recorded and for calculating a target bottom level at the monitored linear velocity by interpolation of the sampled first and second bottom levels, thereby outputting the bottom level control signal according to a difference between the calculated target bottom level and the actual bottom level of the laser power.

6 Claims, 5 Drawing Sheets

OPTICAL DISK RECORDING APPARATUS

BACKGROUND OF THE INVENTION

1. Field of the Invention

This invention relates to a laser output control for a optical disk apparatus of a CAV recording system designed to record information by optical laser power in an optical disk such as CD-R, CD-RW, CD-WO, MD, DVD, DRAW or the like.

2. Background Art

With regard to a DRAW optical disk or a rewritable optical disk, for example, a dye-containing recording material or the like is coated, and a record pit is formed thereon by irradiating the recording material with a laser light beam. To stably form the record pit on the optical disk under a constant condition, a laser diode (LD) driving current must be controlled such that always the constant laser power can be obtained. As a recording signal waveform of the laser light, for example as shown in FIG. 4, a basic pattern is a rectangular waveform raised from a bottom level BP (=read level RP) to a write level WP for forming a record pit. Variation of the read level and the bottom level adversely affect focusing and tracking servo gains. Also, variation of the write level affects the formation quality of the record pit. Thus, to realize a stable recording/reproducing operation, LD driving control must be performed such that the read level RP, the bottom level BP and the write level WP can always maintain respective target levels.

FIG. 5 is a block diagram showing the configuration of a laser output control unit for a conventional optical disk recording/reproducing apparatus designed to perform such LD driving control. A laser light from a laser diode (LD) 2 driven by a laser driving device 1 is irradiated to an optical disk for reading information written in the optical disk, and for writing information in the optical disk. The target value of the output power of the laser light in this case is equal to the read level RP of FIG. 4 in the reading mode, and equal to the bottom level BP or the write level WP of FIG. 4 in the write mode. A photodiode (PD) 3 receives a part of a reflected light from the optical disk or a part of the laser light irradiated to the optical disk, and converts the received light into an electric signal. A light signal outputted from this PD 3 is converted from a current signal into a voltage signal by an I/V converter 4, and is outputted as a laser output detecting signal I/VOUT. The laser output I/VOUT is supplied to a read/bottom power detecting circuit 5 and a write power detecting circuit 6. The read/bottom power detecting circuit 5 detects a read power RP by sampling and holding the laser output detecting signal I/VOUT at a predetermined time interval on the reading mode, and detects a bottom power BP by sampling and holding the bottom part of the rectangular wave of the laser output detecting signal I/VOUT on the writing mode. The write power detecting circuit 6 detects a write power RP by sampling and holding the peak part of the rectangular wave of the laser output detecting signal I/VOUT on the writing mode. Sampling and holding timings at the read/bottom power detecting circuit 5 and the write power detecting circuit 6 are controlled by a laser power switching control unit 7 in accordance with an eight to fourteen modulation (EFM) signal representing a recording signal. Regarding a read/bottom power detecting signal R/BPD outputted from the read/bottom power detecting circuit 5, a read/bottom power target value R/BPRef is subtracted by a subtracter 8 to generate a read/bottom power control signal R/BPC, and this signal is supplied to A terminal side of a switching device 10. From a write power detecting signal WPD outputted from the write power detecting circuit 6, a write power target value WPRef is subtracted by a subtracter 9 to generate a write power control signal WPC, and this signal is supplied to B terminal side of the switching device 10. The switching device 10 is subjected to switching control by the laser power switching control unit 7 in accordance with the EFM signal, and either of the control signals R/BPC and WPC is selectively supplied to the laser driving device 1.

FIG. 6 is a time chart showing the operation of the conventional laser output control apparatus constructed in the foregoing manner. During the reading mode, the laser output control apparatus controls the laser driving device 1 such that the switching device 10 is fixed to the A terminal side, and the laser power can be set to a constant read level RP, which is lowered for forming no pits on the disk. During the writing mode, the laser output control apparatus controls the laser driving device 1 such that at a pit portion, the switching device 10 is connected to the B terminal side, and a pit can be formed on the disk by raising the laser power to the write level. At a land portion, the switching device 10 is connected to the A terminal side, and a constant bottom level BP lowered for forming no pits on the disk can be set.

In the optical disk apparatus for performing a constant angular velocity (CAV) recording (including partial CAV recording), since a recording operation at a constant recording density is carried out while maintaining the rotational speed of a spindle constant, a recording rate (linear velocity) is increased as a recording position on the optical disk is shifted from the inner periphery to the outer periphery. On the other hand, a bottom level BP in the writing mode is obtained by sampling and holding the bottom part of the rectangular wave of the laser output detecting signal I/VOUT. However, as the recording rate is increased, the response speed of the detection system including the PD3 cannot follow and, as indicated by the dotted-line portion of the enlarged view of the laser output detecting signal I/VOUT in FIG. 6, waveform deformation occurs in the laser output detecting signal I/VOUT. If this dull portion is sampled and held, then the offset occurs between the detecting signal R/BRD of the read/bottom power detecting circuit 5 and an actual bottom level. Such an offset causes the laser driving device 1 to lower a bottom level during the recording. Consequently, a laser driving signal R/BP becomes lower than an optimal value. This offset is also affected by the write power and, if the write power is increased following the increase of the recording rate, the offset is increased more.

If there is a variation in the bottom level due to such a change of the recording rate, then focussing and tracking gains are changed, bringing about the problem of unstable servo control. Further, if the offset is large, laser output may disappear.

SUMMARY OF THE INVENTION

The present invention is made to solve the foregoing problems, and objects of the invention are to provide a laser output control for an optical disk recording apparatus, being capable of controlling a laser power to an optimal value, and enabling a stable recording operation to be performed, in the optical disk recording apparatus of a CAV system, in which a recording rate is changed depending on a recording position.

An inventive optical disk recording and reproducing apparatus is operative in a read mode for controlling a laser driver to maintain a laser power at a target read level so as to read a signal from an optical disk, and is operative in a write mode for controlling the laser driver to alternate the laser power between a target write level and a target bottom level comparative with the target read level so as to write a signal at a constant density into the optical disk which is rotated at a constant angular velocity. In the inventive apparatus, a first detector is operative in the read mode for detecting a read level of the laser power, and is operative in the write mode for detecting a bottom level of the laser power. A first controller is operative in the read mode for outputting a read level control signal according to a difference between the detected read level and the target read level, and is operative in the write mode for outputting a bottom level control signal according to a difference between the detected bottom level and the target bottom level. A second detector is operative in the write mode for detecting a write level of the laser power. A second controller is operative in the write mode for outputting a write level control signal according to a difference between the detected write level and the target write level. A third controller is operative in the read mode for providing the read level control signal to the laser driver, and is operative in the write mode for alternately providing the write level control signal and the bottom level control signal to the laser driver in accordance with the signal to be written into the optical disk. The first controller operates in a pre-write mode prior to the write mode for performing a writing operation at different linear velocities along the optical disk to sample at least first and second bottom levels of the laser power, and operates in the write mode for monitoring a linear velocity at a point of the optical disk where the signal is to be recorded and for calculating a target bottom level at the monitored linear velocity by interpolation of the sampled first and second bottom levels, thereby outputting the bottom level control signal according to a difference between the calculated target bottom level and the detected bottom level of the laser power.

Preferably, the first controller comprises a sample & hold section that samples the read level control signal immediately before the read mode is switched to the pre-write mode and that holds the sampled read level control signal after the read mode is switched to the pre-write mode, a calculating section that samples the first and second bottom levels detected in the pre-write mode and then calculates the target bottom level at the monitored linear velocity in the write mode by the interpolation of the first and second bottom levels sampled in the pre-write mode, and a control section that outputs the sampled and held read level control signal as a bottom level control signal in the pre-write mode, and subsequently outputs another bottom level control signal according to a difference between the detected bottom level and the target bottom level which is calculated in correspondence with the monitored linear velocity. In such a case, the calculating section calculates the target bottom level of the laser power in the write mode for each point of the optical disk according to the first and second bottom levels sampled at the pre-write mode. Further, the calculating section samples the first and second bottom levels detected at different linear velocities which are set by varying a clock rate of a signal while maintaining the constant angular velocity of the optical disk.

Preferably, the first controller corrects the target bottom level in accordance with the write level of the laser power detected in the write mode.

An inventive method is designed for controlling an optical recording and reproducing apparatus which is operative in a read mode for controlling a laser driver to maintain a laser power at a target read level so as to read a signal from an optical disk, and which is operative in a write mode for controlling the laser driver to alternate the laser power between a target write level and a target bottom level comparative with the target read level so as to write a signal at a constant density into the optical disk which is rotated at a constant angular velocity. The inventive method is carried out by the steps of providing a bottom sampling period prior to a period of the write mode for sampling a bottom level associated to a linear velocity of the optical disk which locally varies while the optical disk rotates at the constant angular velocity, performing a writing operation in the bottom sampling period at different linear velocities so as to sample at least first and second bottom levels, monitoring a linear velocity at a point where the signal is to be recorded in the write mode, calculating the target bottom level for the monitored linear velocity by interpolation of the sampled first and second bottom levels, detecting a bottom level of the laser power in the write mode, and outputting the bottom level control signal to control the laser driver in accordance with a difference between the detected bottom level and the calculated target bottom level.

According to the invention, before an actual writing mode, the recording operation is carried out by at least two kinds of linear velocities to sample a bottom level. On the writing mode, a linear velocity for recording is obtained from the recording position of the optical disk, and the target value of the bottom level at the obtained linear velocity is calculated from the sampled bottom levels of different linear velocities by interpolation processing. A bottom level control signal corresponding to a difference between the calculated target value of the bottom level and the detected value of the bottom level detected by the read/bottom level detecting means is outputted to control the laser driving means. Thus, no errors are generated even if the recording rate is changed following the recording position, and control can be performed such that the bottom power can be always maintained constant.

DESCRIPTION OF THE PREFERRED EMBODIMENTS

Figure 1:
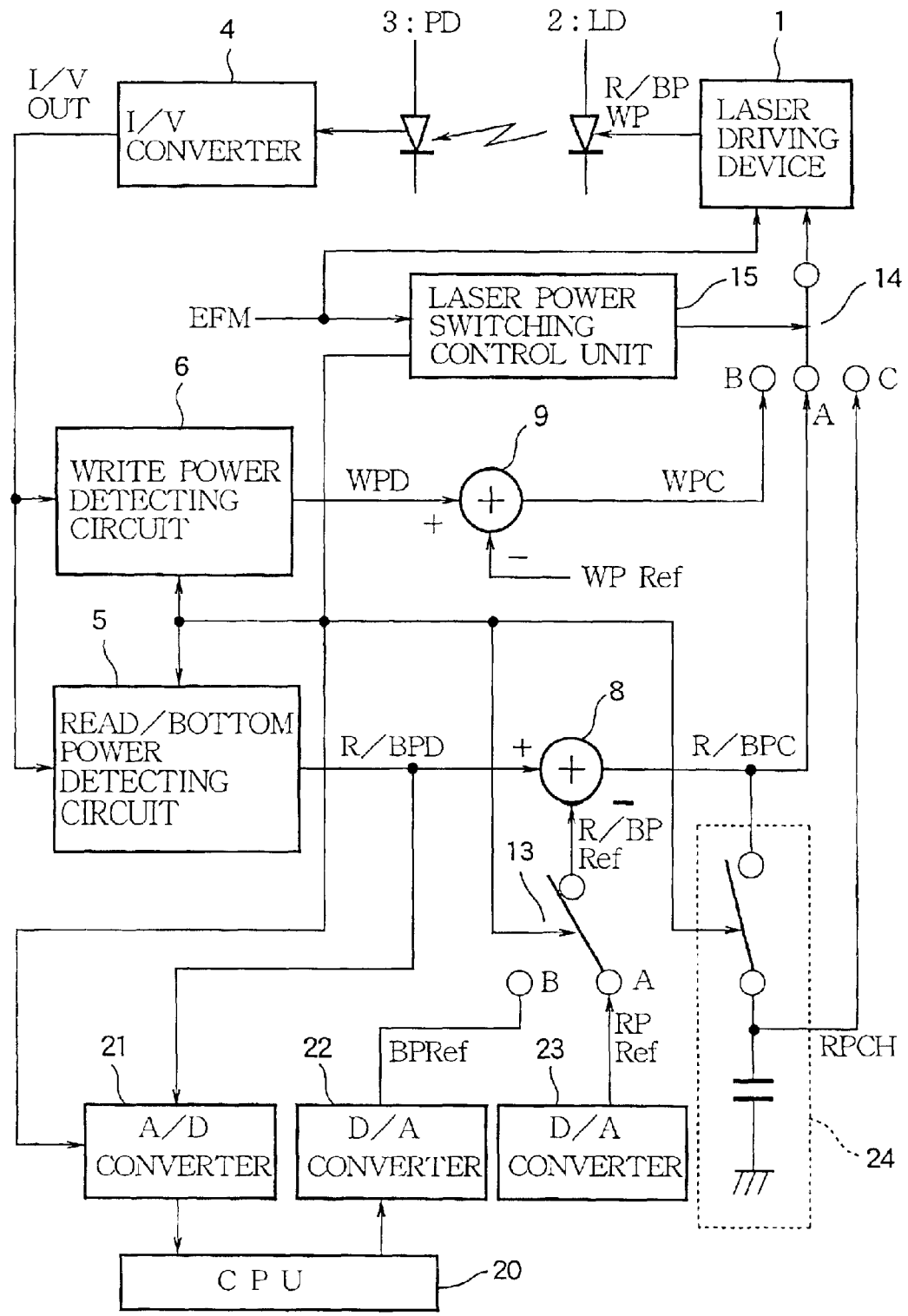
FIG. 1 is a block diagram showing a laser output control for an optical disk recording apparatus according to an embodiment of the invention.
Figure 4:
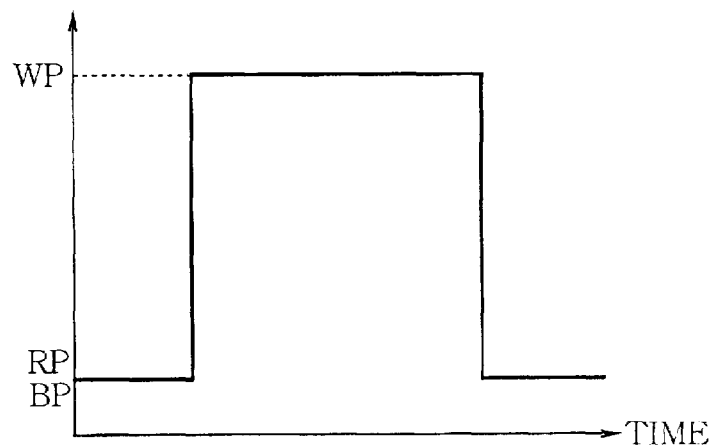
FIG. 4 is a view illustrating read power, bottom power and write power.
Figure 5:
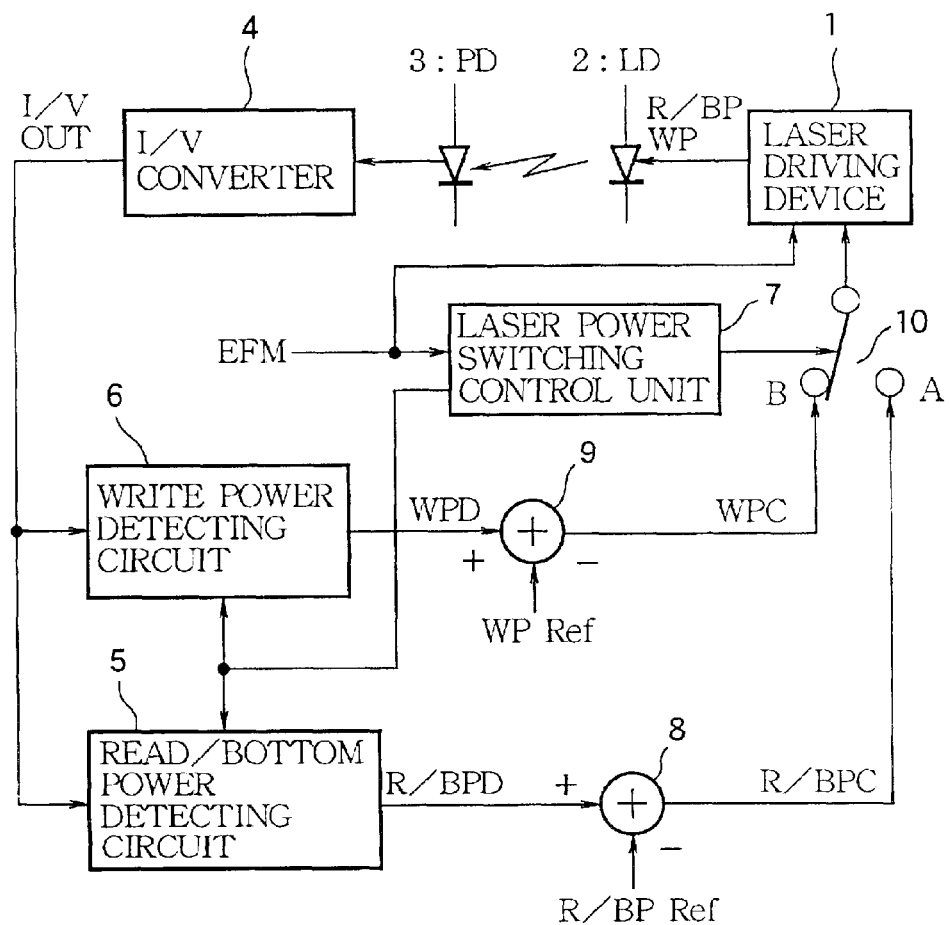
FIG. 5 is a block diagram showing a laser output control for a conventional optical disk recording/reproducing apparatus.
Figure 6:
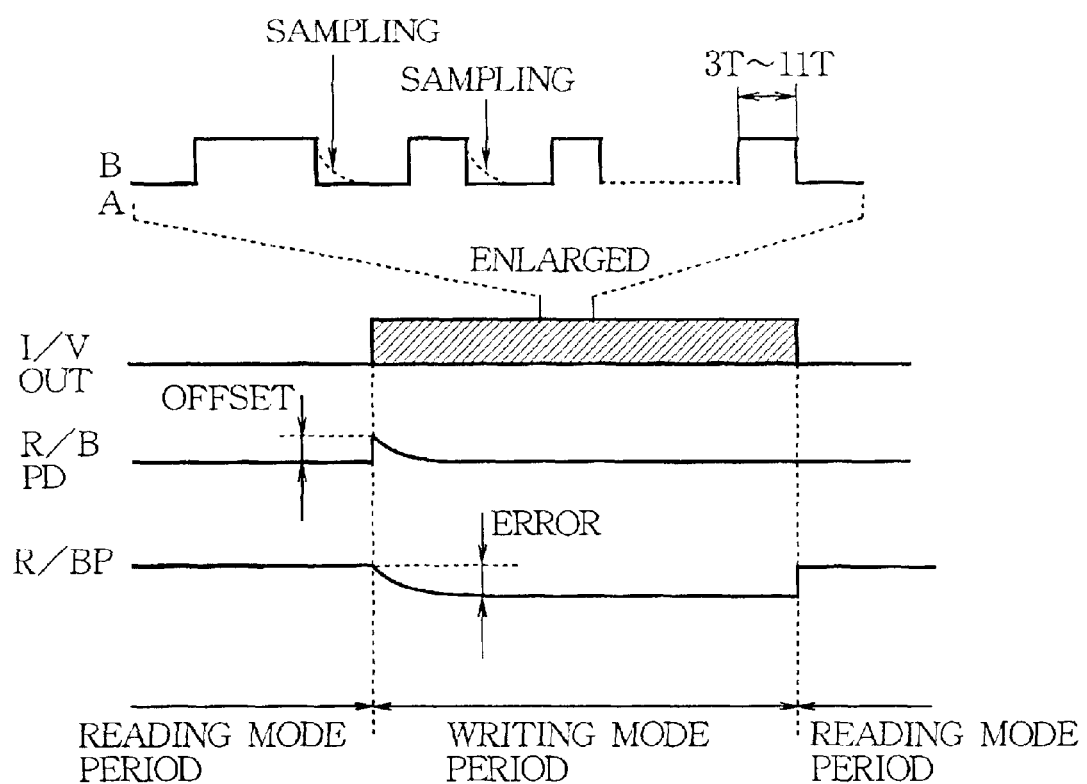
FIG. 6 is a timing chart showing an operation of the conventional apparatus.

Next, preferred embodiments of the present invention will be described with reference to the accompanying drawings. FIG. 1 is a block diagram showing the configuration of a laser output control for an optical disk recording/reproducing apparatus according to an embodiment of the invention. In FIG. 1, a laser light from a laser diode (LD) 2 driven by a laser driving device 1 is irradiated to an optical disk for reading information written in the optical disk, and for writing information in the optical disk. The target value of the output power of the laser light in this case is equal to the read level RP of FIG. 4 in the reading mode, and equal to the bottom level BP or the write level WP of FIG. 4 in the write mode. A photodiode (PD) 3 receives a part of a reflected light from the optical disk or a part of the laser light irradiated to the optical disk, and converts the received light into an electric signal. A light signal outputted from this PD 3 is converted from a current signal into a voltage signal by an I/V converter 4, and is outputted as a laser output detecting signal I/VOUT. The laser output I/VOUT is supplied to a read/bottom power detecting circuit 5 and a write power detecting circuit 6. The read/bottom power detecting circuit 5 detects a read power RP by sampling and holding the laser output detecting signal I/VOUT at a predetermined time interval on the reading mode, and detects a bottom power BP by sampling and holding the bottom part of the rectangular wave of the laser output detecting signal I/VOUT on the writing mode. The write power detecting circuit 6 detects a write power RP by sampling and holding the peak part of the rectangular wave of the laser output detecting signal I/VOUT on the writing mode. Sampling and holding timings at the read/bottom power detecting circuit 5 and the write power detecting circuit 6 are controlled by a laser power switching control unit 15 in accordance with an eight to fourteen modulation (EFM) signal representing a recording signal. Regarding a read/bottom power detecting signal R/BPD outputted from the read/bottom power detecting circuit 5, a read/bottom power target value R/BPRef is subtracted by a subtracter 8 to generate a read/bottom power control signal R/BPC, and this signal is supplied to a switching device 14. From a write power detecting signal WPD outputted from the write power detecting circuit 6, a write power target value WPRef is subtracted by a subtracter 9 to generate a write power control signal WPC, and this signal is supplied also to the switching device 14. The switching device 14 is subjected to switching control by the laser power switching control unit 15 in accordance with the EFM signal, and either of the control signals R/BPC and WPC is selectively supplied to the laser driving device 1.

This laser output control apparatus includes characteristic components, i.e., a CPU 20, an A/D converter 21, D/A converters 22 and 23, and a sampling and holding circuit 24. The A/D converter 21 is provided to sample information necessary for determining a target value of the bottom power at each recording position for CAV recording. The A/D converter 21 samples a read/bottom power detecting signal R/BPD outputted from the read/bottom power detecting circuit 5 before the CAV recording, and subjects the signal to A/D conversion based on control from the laser power switching control unit 15. The CPU 20 captures the sampled values of the bottom power from the A/D converter 21 regarding at least two kinds of recording rates, then obtains a relation (equation) between a linear velocity and a target value of the bottom power from the sampled values, further obtains a linear velocity for recording from a rotational speed of a disk motor, an actual recording position and a recording density in a writing mode, and then calculates a target value of the bottom level corresponding to the actual linear velocity based on the relation between the linear velocity and the target of the bottom level. This calculated target value is subjected to D/A conversion by the D/A converter 22, and then supplied as the target value BPRef of the bottom power to B terminal side of a switching device 13. A read power target value RPRef is supplied from the other D/A converter 23 to terminal side of the switching device 13. The switching device 13 switches these target values BPRef and RPRef, and supplies a read/bottom power target value R/BPRef to the subtracter 8.

On the other hand, the sampling and holding circuit 24 is provided to store a bottom power control signal. The sampling and holding circuit 24 samples a read/bottom power control signal R/BPC outputted from the subtracter 8 immediately before transition to a writing mode from a reading mode, and holds the sampled signal after the transition to the writing mode based on control from the laser power control unit 15.

The switching device 14 includes A, B and C terminals, and receives the read/bottom power control signal R/BPC outputted from the subtracter 8 to the A terminal; the write power control signal WPC outputted from the subtracter 9 to the B terminal; and a holding value RPCH of the sampling and holding circuit 24 to the C terminal. These signals are switched based on control from the laser power switching control unit 15, and selectively supplied to the laser driving device 1. Here, the first controller or read/bottom level control signal outputting means of the invention is composed of the subtracter 8, the switching device 13, the CPU 20, the A/D converter 21, the D/A converters 22 and 23, and the sampling and holding circuit 24.

Figure 2:
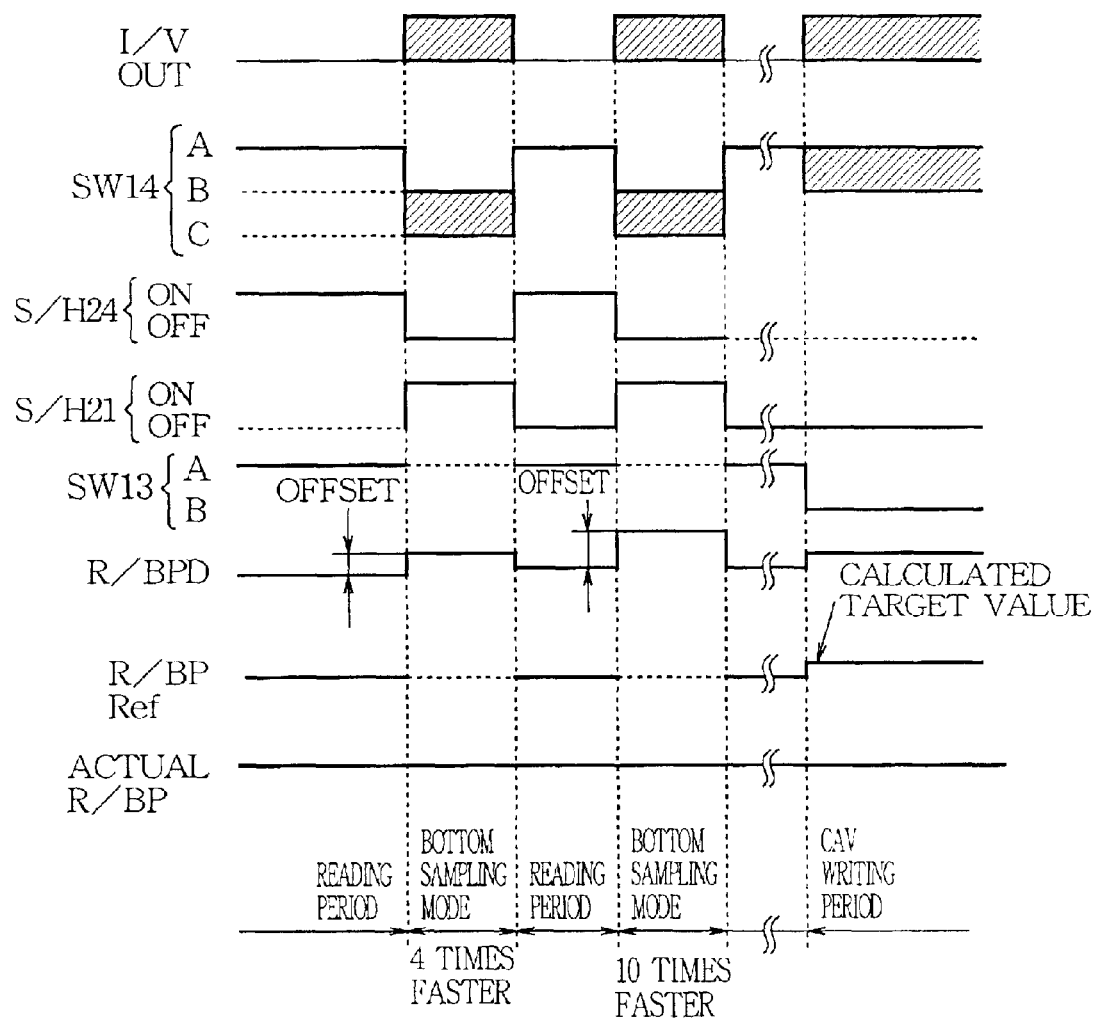
FIG. 2 is a timing chart showing an operation of the inventive apparatus.

FIG. 2 is a timing chart illustrating the operation of the laser output control constructed in the foregoing manner. In a period before CAV recording (writing mode), a bottom power is sampled for a plurality of linear velocities. Specifically, first, on the writing mode, the switching devices 13 and 14 are fixed to the A terminal. Consequently, the laser driving device 1 for driving the LD 2 is controlled such that the power of a laser light from the LD 2 can be set equal to a read power target value RPRef of a level which is lowered for forming no pits on a disk. At this time, the sampling and holding circuit 24 is set in a sampling state (switch ON).

In a subsequent sampling period, a recording signal of a speed 4 times faster is supplied to LD2 to carry out a recording operation, and then the A/D converter 21 is operated to subject the read/bottom power detecting signal R/BPD from the read/bottom power detecting circuit 5 to A/D conversion. The CPU 20 stores an output from this A/D converter 21. For this recording operation, in actual practice, it is not necessary to set a linear speed to 4 times faster by changing the rotational speed of the spindle or by changing the recording position for optical disk driving, and a clock rate only needs to be set to a speed 4 times faster. In addition, if the monitoring of LD power at the PD 3 is possible without any actual recording, it is not an essential requirement to actually record information in the optical disk. It is only necessary to light the LD by power similar to that during the recording.

In this period, the sampling and holding circuit 24 is set in a holding state (switch OFF), and the switching device 14 alternately switches a write power control signal supplied to the B terminal and a holding value RPCH supplied to the C terminal. Thus, as a bottom power control signal supplied to the laser driving device 1, the holding value RPCH of the sampling and holding circuit 24 equal to a read power control signal immediately before the entry to the bottom sampling period is used. Therefore, even if an offset occurs in the bottom level, the control signal for deciding the bottom power is not changed in this period, and maintains a level similar to that in the reading mode period.

Then, after another reading mode period similar to the first reading mode period described above, supply is made to LD 2 with a recording signal of a speed 10 times faster, and a recording operation of the bottom sampling period similar to that of the speed 4 times faster is carried out. The output of the A/D converter 21 in this case is also stored in the CPU 20. For the write power WP in the bottom sampling period, a representative value at a measured recording rate may be used.

Then, after the entry to the CAV recording period (writing mode), the CPU 20 obtains a linear velocity at a recording position of the optical disk according to the rotational speed and the recording density of the optical disk, and calculates a target value BPRef of the bottom power corresponding to this linear velocity. This target value BPRef of the bottom power can be obtained by linear interpolation or the like based on the bottom power BP (4) obtained in the first bottom sampling period of the speed 4 times faster and the other bottom power BP (10) obtained in the second bottom sampling period of the speed 10 times faster. In this writing period, since the switching device 13 is switched to the B terminal side, the target value BPRef of the bottom power is supplied as a target value R/BPRef to the subtracter 8, and servo control is applied thereto. Accordingly, since an offset is included similarly in the detected value and the target value, the laser power control is carried out in a state where the effect of an offset has been removed from the read/bottom power control signal R/BPC. The switching device 14 switches the A and B terminals with each other in the bottom servo period, and feedback control of the bottom level and write level is executed.

According to the inventive laser output control, in the bottom sampling period or pre-writing period, the read power control voltage of the reading mode period is continuously applied to the LD 2, and thus an open loop is formed. However, this bottom sampling period is a relatively short time because it is only necessary to set a time for sampling a bottom power value at each recording rate, and the outputted bottom laser power of the LD 2 is equal to that of the reading mode. Then, the sampled bottom power value of the bottom sampling period becomes a target voltage when the bottom power of a level equal to that of the reading mode is outputted. Thus, no errors occur even if an offset occurs in the bottom power detected by the read/bottom power detecting circuit 5, and control can be performed to maintain the bottom power constant.

The invention should not be limited to the foregoing embodiment. For example, in the above embodiment, the bottom sampling is performed at two different liner velocities (faster by 4 and 10 times). However, bottom power sampling may be performed at three or more different linear velocities. In this case, multiple interpolation processing may be executed in accordance with an offset characteristic. Regarding the interpolation processing, not only pure interpolation but also extrapolation may be carried out. For example, a target value of the bottom power of a speed 10 times faster may be obtained from the bottom power of a speed 4 times faster and the bottom power of a speed 6 times faster.

In addition, in the above embodiment, the second reading mode period is provided between the first bottom sampling period of the speed 4 times faster and the second bottom sampling period of the speed 10 times faster. However, instead of providing the second reading mode period, a bottom sampling period having different linear velocities may be set to be continuous. This bottom sampling period may be set during a test recording for obtaining an optimal power in the test area of a power calibration area (PCA), or during the writing of information in a counting area.

The offset of the bottom level may be varied by a write power other than a recording rate. Thus, the bottom power sampling may be performed by variously changing the write power in the bottom sampling period. In the test area of the PCA, the write power is originally changed in stepwise to obtain the optimal power. Bottom power with respect to each write power may be sampled in this case.

Figure 3:
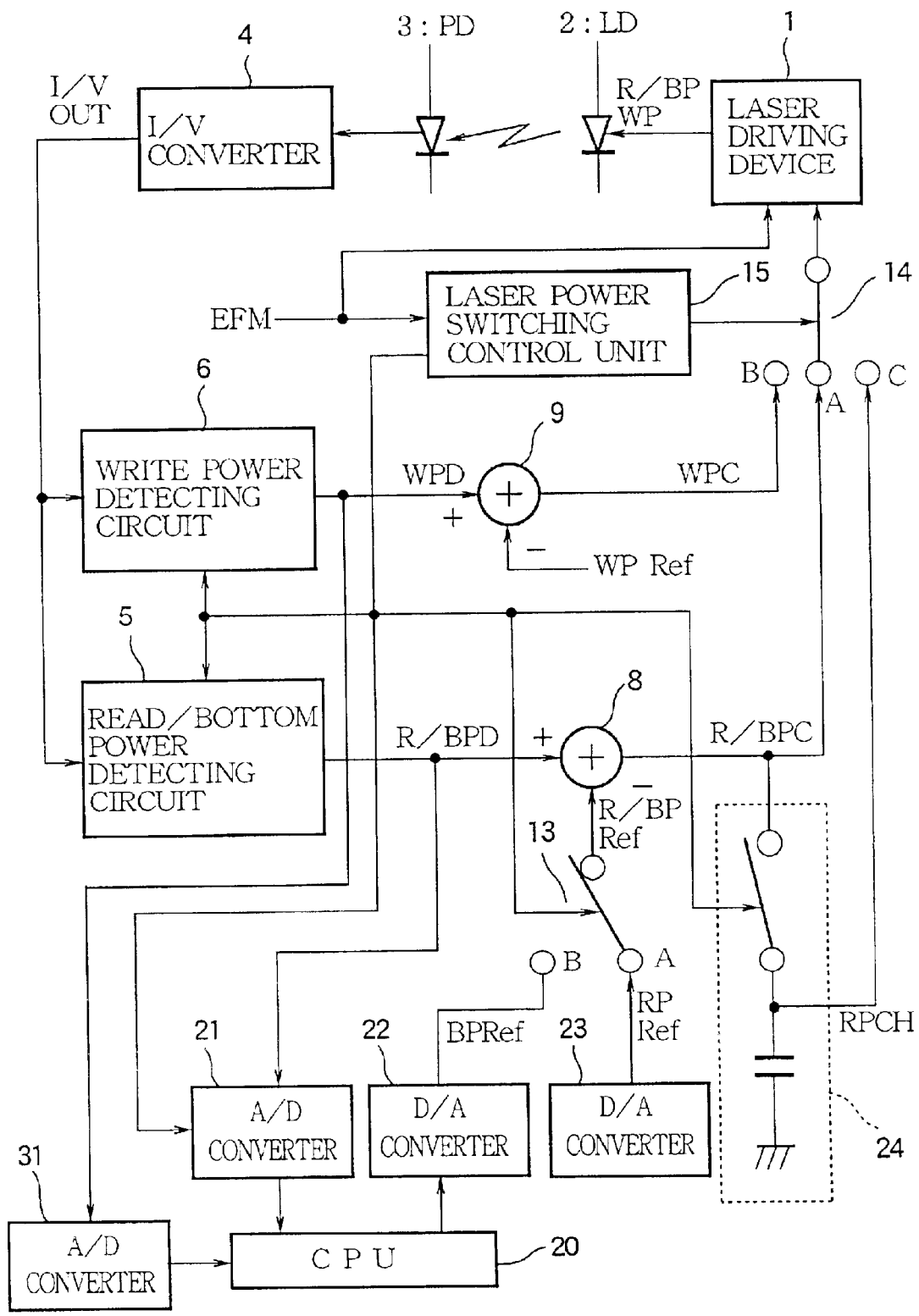
FIG. 3 is a block diagram showing a laser output control for an optical disk recording apparatus according to another embodiment of the invention.

FIG. 3 is a block diagram showing the configuration of an optical disk recording apparatus according to another embodiment, in which a write power is also monitored. The output WPD of the write power detecting circuit 6 is subjected to A/D conversion by an A/D converter 31, and captured in the CPU 20. The CPU 20 corrects the target value of the bottom power based on the write power. The remaining arrangements are similar to those of the first embodiment.

According to this embodiment, if the write power is changed corresponding to the change of a recording rate, the target value of the bottom power obtained from a monitored linear velocity can be corrected or adjusted by the write power. Thus, more stable control can be performed.

As described above, according to the present invention, the pre-writing operation is carried out by at least two kinds of linear velocities to sample and hold the bottom level, and a relation between the linear velocity and the target value of the bottom level is obtained from the sampled and held values. On the writing mode, a linear speed for recording is obtained from the recording position of the optical disk, and the target value of the bottom level at the obtained linear speed is determined based on the relation between the linear speed and the target value of the bottom level. Then, a bottom level control signal is outputted in accordance with a difference between the obtained target value of the bottom level and the actual value of the bottom level detected by the read/bottom level detecting means, and the laser driving means is controlled. As a result, without generating any errors even if the recording rate is changed following the recording position, it is possible to perform control to maintain the bottom power always constant.

What is claimed is:

1. An optical disk recording and reproducing apparatus being operative in a read mode for controlling a laser driver to maintain a laser power at a target read level so as to read a signal from an optical disk, and being operative in a write mode for controlling the laser driver to alternate the laser power between a target write level and a target bottom level comparative with the target read level so as to write a signal at a constant density into the optical disk which is rotated at a constant angular velocity, the apparatus comprising:

a first detector being operative in the read mode for detecting a read level of the laser power, and being operative in the write mode for detecting a bottom level of the laser power;

a first controller being operative in the read mode for outputting a read level control signal according to a difference between the detected read level and the target read level, and being operative in the write mode for outputting a bottom level control signal according to a difference between the detected bottom level and the target bottom level;

a second detector operative in the write mode for detecting a write level of the laser power;

a second controller operative in the write mode for outputting a write level control signal according to a difference between the detected write level and the target write level; and a third controller being operative in the read mode for providing the read level control signal to the laser driver, and being operative in the write mode for alternately providing the write level control signal and the bottom level control signal to the laser driver in accordance with the signal to be written into the optical disk, wherein the first controller operates in a pre-write mode prior to the write mode for performing a writing operation at different linear velocities along the optical disk to sample at least first and second bottom levels of the laser power, and operates in the write mode for monitoring a linear velocity at a point of the optical disk where the signal is to be recorded and for calculating a target bottom level at the monitored linear velocity by interpolation of the sampled first and second bottom levels, thereby outputting the bottom level control signal according to a difference between the calculated target bottom level and the detected bottom level of the laser power.

2. The optical disk recording and reproducing apparatus according to claim 1, wherein the first controller comprises a sample & hold section that samples the read level control signal immediately before the read mode is switched to the pre-write mode and that holds the sampled read level control signal after the read mode is switched to the pre-write mode, a calculating section that samples the first and second bottom levels detected in the pre-write mode and then calculates the target bottom level at the monitored linear velocity in the write mode by the interpolation of the first and second bottom levels sampled in the pre-write mode, and a control section that outputs the sampled and held read level control signal as a bottom level control signal in the pre-write mode, and subsequently outputs another bottom level control signal according to a difference between the detected bottom level and the target bottom level which is calculated in correspondence with the monitored linear velocity.

3. The optical disk recording and reproducing apparatus according to claim 2, wherein the calculating section calculates the target bottom level of the laser power in the write mode for each point of the optical disk according to the first and second bottom levels sampled at the pre-write mode.

4. The optical disk recording and reproducing apparatus according to claim 2, wherein the calculating section samples the first and second bottom levels detected at different linear velocities which are set by varying a clock rate of a signal while maintaining the constant angular velocity of the optical disk.

5. The optical disk recording and reproducing apparatus according to claim 1, wherein the first controller corrects the target bottom level in accordance with the write level of the laser power detected in the write mode.

6. A method of controlling an optical recording and reproducing apparatus which is operative in a read mode for controlling a laser driver to maintain a laser power at a target read level so as to read a signal from an optical disk, and which is operative in a write mode for controlling the laser driver to alternate the laser power between a target write level and a target bottom level comparative with the target read level so as to write a signal at a constant density into the optical disk which is rotated at a constant angular velocity, the method comprising the steps of:

providing a bottom sampling period prior to a period of the write mode for sampling a bottom level associated to a linear velocity of the optical disk which locally varies while the optical disk rotates at the constant angular velocity;

performing a writing operation in the bottom sampling period at different linear velocities so as to sample at least first and second bottom levels;

monitoring a linear velocity at a point where the signal is to be recorded in the write mode;

calculating the target bottom level for the monitored linear velocity by interpolation of the sampled first and second bottom levels;

detecting a bottom level of the laser power in the write mode; and outputting the bottom level control signal to control the laser driver in accordance with a difference between the detected bottom level and the calculated target bottom level.

* * * * *